United States Patent [19]

Myerson et al.

[11] Patent Number: 5,453,111

[45] Date of Patent: Sep. 26, 1995

[54] METHOD FOR SEPARATION OF METALS FROM WASTE STREAM

[75] Inventors: Allan S. Myerson, Brooklyn, N.Y.; Michael W. Cudahy, Effingham, S.C.

[73] Assignee: Metals Recycling Technologies, Inc., Atlanta, Ga.

[21] Appl. No.: 302,179

[22] Filed: Sep. 8, 1994

Related U.S. Application Data

[63] Continuation-in-part of Ser. No. 238,250, May 4, 1994, which is a continuation-in-part of Ser. No. 953,645, Sep. 29, 1992, abandoned, which is a continuation-in-part of Ser. No. 820,987, Jan. 15, 1992, Pat. No. 5,208,004, said Ser. No. 302,179, Sep. 8, 1994, and a continuation-in-part of Ser. No. 277,233, Jul. 19, 1994.

[51] Int. Cl.$^6$ .................................................. C22B 19/24
[52] U.S. Cl. ........................ 75/725; 75/724; 423/622; 423/623
[58] Field of Search .................. 75/724, 725; 423/622, 423/623

[56] References Cited

U.S. PATENT DOCUMENTS

| | | | |
|---|---|---|---|
| 2,503,479 | 4/1950 | Griffith | 75/724 |
| 4,071,357 | 1/1978 | Peters | 423/622 |

*Primary Examiner*—Peter D. Rosenberg
*Attorney, Agent, or Firm*—Deveau, Colton & Marquis

[57] ABSTRACT

A method for the recovery of metals including zinc, zinc oxide, iron-carbon feedstocks, lead and cadmium from industrial waste streams which entails treating the waste streams with carbon and an ammonium chloride solution, separating any undissolved components from the solution, displacing metal ions including lead and cadmium from the solution using zinc metal, further treating the solution to remove zinc compounds therefrom, further treating the zinc compounds and the undissolved components with a dissolving solution, and further treating the displaced metal ions to recover lead, cadmium and zinc therein using various methods including electrolysis.

18 Claims, No Drawings

1

METHOD FOR SEPARATION OF METALS FROM WASTE STREAM

STATEMENT OF RELATED APPLICATIONS

This application is a continuation-in-part of application Ser. No. 08/238,250 filed May 4, 1994 which is a continuation-in-part of application Ser. No. 07/953,645 filed on Sep. 29, 1992, abandoned, which is a continuation-in-part of application Ser. No. 07/820,987 filed on Jan. 15, 1992, which issued as U.S. Pat. No. 5,208,004 on May 4, 1993. This application is also a continuation-in-part of application Ser. No. 08/277,233 filed on Jul. 19, 1994.

BACKGROUND OF THE INVENTION

1. Field of the Invention

The present invention relates generally to a process for the recovery of metals from industrial waste streams comprising zinc compounds and iron compounds. The present invention relates more specifically to a process subjecting a waste materials stream comprising zinc compounds and iron compounds, such as electric arc furnace (EAF) dust, to a combination of leaching and reducing steps, which enable the separation and recovery from the waste materials stream of essentially pure zinc oxide, zinc metal, iron and carbon compounds, lead, and cadmium.

2. Prior Art

Zinc oxide typically is a coarse white or grayish powder which has a variety of uses including as an accelerator activator, as a pigment, as a dietary supplement and in the semiconductor field. Zinc oxide is found in commercial by-products including waste material streams such as fly ash and flue dust. Methods for recovering zinc oxides are known in the art, including recovering zinc oxide from industrial waste materials. Such previous methods have included leaching with mineral acid, caustic soda, ammonium hydroxide, and ammonium carbonate solutions. However, these methods have low yields of zinc oxide and typically do not recover pure zinc oxide, the recovered zinc oxide being contaminated with other metal salts. Therefore, in order to obtain pure zinc oxide, subsequent roasting and evaporation processes were necessary.

U.S. Pat. No. 3,849,121 to Burrows, now expired but which was assigned to a principal of the assignee of the present invention, discloses a method for the selective recovery of zinc oxide from industrial waste. The Burrows method comprises leaching a waste material with an ammonium chloride solution at elevated temperatures, separating iron from solution, treating the solution with zinc metal and cooling the solution to precipitate zinc oxide. The Burrows patent discloses a method to take EAF dust which is mainly a mixture of iron and zinc oxides and, in a series of steps, to separate out the iron oxides and waste metals. However, the material obtained in the last step is a mixture of a small amount of zinc oxide, hydrated zinc phases which can include hydrates of zinc oxide and zinc hydroxide, as well as other phases and a large amount of diamino zinc dichloride $Zn(NH_3)_2Cl_2$ or other similar compounds containing zinc and chlorine ions. Currently, the Burrows method is not economically viable because of Environmental Protection Agency guidelines established subsequent to the issuance of the Burrows patent. Additionally, the Burrows method is not a continuous method and, therefore, is not economical as a continuous process.

The first step in the Burrows patent is the treating of the EAF dust with an ammonium chloride solution. The action of the treatment is the leaching of zinc oxide, lead oxide and cadmium oxide in the solution without any leaching of the iron oxides present. Twenty to fifty percent of the zinc present in the Burrows dust is in the form of an iron-zinc complex (known as a spinel) which cannot be leached by the ammonium chloride solution. The Burrows process therefore cannot leach and recover a significant portion of zinc present in the EAF dust.

The second step in the Burrows process is cementation in which the solution obtained from the initial leach is filtered to remove any remaining solids and then zinc dust is added. The zinc dust causes an electrochemical reaction which causes the lead and cadmium to deposit on the zinc particles. Burrows does not teach the need to remove the lead and cadmium in this step efficiently without using a large amount of zinc. If the process requires too much zinc in this step, it will not be economically viable. The zinc powder when added tends to clump together reducing the available surface area and requiring the addition of more zinc.

The third step in the Burrows patent then takes the filtrate from the cementation process and cools the filtrate and obtains what are called "zinc oxide" crystals. Burrows indicates that these crystals range in size up to ⅜ of an inch. Burrows does not produce zinc oxide of any degree of purity; x-ray diffraction figures clearly show that upon crystallization there is a mixture of many phases. Washing the crystals is not sufficient to purify the material to zinc oxide since zinc hydroxide and hydrates are also present, so that a drying step is necessary. In addition, the control of the size of the zinc oxide along with the purity is crucial. Commercial zinc oxide normally has a requirement that 99% of the particles fit through 325 mesh (44 microns). Burrows indicates no method of cooling or controlling either purity or size, and the particles produced do not meet commercial requirements. Further, a significant portion of the ammonium chloride is lost in the crystal washing step when the diamino zinc dichloride decomposes.

Waste metal process dust typically has varying amounts of lead, cadmium and other metals contained in the dust. For various reasons, it is desirable to remove such metals from the waste metal dust, for example to recycle the lead and cadmium and/or to prevent introduction of the lead and cadmium into the atmosphere. The Burrows patent includes a method for removing dissolved lead and cadmium from the ammonium chloride solutions which have been used to treat the waste metal dust by the addition of powdered zinc dust to the ammonium chloride solutions. The resulting electrochemical reaction forms elemental lead deposits on the surface of the powdered zinc dust. For this reaction to proceed, a large surface area of zinc initially must be present because as the lead covers the zinc dust particle, the particle becomes no longer available for the electrochemical reaction. For this reason, very fine powder is used which, unfortunately, immediately aggregates to form large clumps which sink to the bottom of the vessel. Rapid agitation does not prevent this from happening. Because of the aggregation of zinc, a large amount of zinc must be added to remove all of the lead, a poor practice for economic reasons. Further, if it is desired to separate the lead and some cadmium from the zinc so that all of these metals can be sold or reused, the higher the zinc concentration in the metals, the larger the mass to be processed per unit mass of zinc.

A further limitation of the Burrows method is that it makes no provision for the separation and recovery of metals such as lead and cadmium which are byproducts of the cementation process. Recovery of these byproducts results in a reduction of waste and produces economically valuable products.

U.S. Pat. No. 4,071,357 to Peters discloses a method for recovering metal values which includes a steam distillation step and a calcining step to precipitate zinc carbonate and to convert the zinc carbonate to zinc oxide, respectively. Peters further discloses the use of a solution containing approximately equal amounts of ammonia and carbon to leach the flue dust at room temperature, resulting in the extraction of only about half of the zinc in the dust, almost 7% of the iron, less than 5% of the lead, and less than half of the cadmium.

Steam distillation is directly contrary to temperature lowering; steam distillation precipitates zinc carbonate, other carbonates and iron impurities, whereas temperature lowering advantageously precipitates a number of crystalline zinc compounds. Steam distillation also disadvantageously results in an increase in temperature which drives off ammonia and carbon dioxide, resulting in the precipitation of iron impurities and then zinc carbonate and other dissolved metals. The purity of the zinc carbonate obtained depends on the rate of steam distillation and the efficiency of solids separation as a function of time. Calcining at temperatures between 200° C. and 1100° C. converts the zinc carbonate to zinc oxide, whereas washing and drying at temperatures between 100° C. and 200° C. converts the zinc compounds to zinc oxide. In addition to the advantages of temperature lowering, the present process also employs a 23% $NH_4Cl$ solution at temperatures ranging from 90°–110° C., and has several distinct advantages over the Peters process:

1. The solubility of zinc and zinc oxide is relatively high in $NH_4Cl$ solution which is important to the efficiency of the present process in terms of the rate of the leaching, the mass of dust that can be processed, and the ability to recycle the solution. The rate of the leaching (which is a dissolution process) is a function of the difference between the zinc concentration in solution and the saturation concentration; the higher the saturation concentration the more rapid the leaching. The present process leaches for only 1 hour, while the Peters process leaches for at least several hours. In addition, the ammonium chloride solution has the added property that the solubility of zinc and zinc oxide in the solution declines rapidly with temperature, which is the basis for the crystallization-based separation which is used later in the present process.

2. Lead and lead oxide, as well as cadmium and cadmium oxide, are soluble in the ammonium chloride solution while iron oxide is virtually insoluble. During the leaching process of the present invention, 95–100% of the zinc present as zinc oxide is extracted, compared to about 55% in Peters; 50–70% of the lead present is removed, compared to less than 5% in Peters; and 50–70% of the cadmium is removed, compared to less than half in Peters. In effect, Peters does not remove a significant amount of the impurities so as to leave an acceptably clean effluent. Peters indicates that his residue, which is high in lead and is a hazardous waste, is discarded. By leaching out a significant portion of the lead and cadmium, the present process produces a material which can be used by the steel producer as they use scrap metal. Likewise, the present process enables separation and recovery of substantially pure lead and cadmium, thereby reducing the overall volume of waste and reclaiming materials having potential economic value.

3. Peters adds powdered zinc to the solution, which has a tendency to clump reducing the surface area available for the dissolution of the zinc and the plating of the lead and cadmium. The present process teaches a method to minimize this effect through the use of an organic dispersant.

In the present process the filtrate from the cementation step is already hot (90°–110° C.) and contains a large amount of dissolved zinc with small amounts of trace impurities. Upon controlled cooling of the solution, crystals of zinc salts begin to appear. Control of the cooling rate and temperature versus time profile is important in controlling the size distribution of the crystals and in reducing or eliminating many of the impurities which might occur. This is especially true of included solution; control of the crystallization can reduce this to virtually zero. In addition, since crystallization is based on differential solubility, and none of the impurities is present in a concentration which can crystallize, the zinc salts are virtually free of any metal impurities.

The final purification step in Peters is a calcining of the zinc carbonate at 600° C. to zinc oxide. In the present process, the mixture of zinc oxide hydrates and diamino zinc dichloride are suspended in hot (90°–100° C.) water. The zinc oxide is not soluble; however, the diamino zinc dichloride is very soluble and completely dissolves. The remaining solid which is zinc oxide hydrates is then filtered and dried at 100°–350° C. to remove the water of hydration. The result is a very pure zinc oxide powder of controlled particle size.

Another process offered by Engitec Impianti SpA, of Milan, Italy proports to recover zinc metal and lead cement directly from EAF flue dust using an electrowinning technology. Electrowinning is the technique of extracting a metal from its soluble salt by an electrolytic cell. Typically, it is used in the recovery of zinc by subjecting the zinc salt in solution to electrolysis and electrodepositing the elemental metal on a zinc cathode in the electrolytic cell. In the Engitec process, the EAF flue dust is leached with a spent electrolyte, such as ammonium chloride, which dissolves the zinc, lead, copper and cadmium in the EAF dust into solution while leaving the iron in solid form. The solution containing the dissolved zinc is placed in an electrolytic cell which draws the zinc from the solution onto a cathode plate, while the other heavy metals are filtered out in solid form into cement cakes. Engitec claims to obtain a zinc yield that is 99.5% pure and a lead cake consisting of a minimum of 70% lead. In effect, the Engitec process takes the product solution from the Burrows process and subjects it to electrowinning. A neutral solution of ammonium and sodium chlorides is heated to between 70° C. and 80° C. The EAF dust is mixed into the chlorides solution in which the zinc and heavy metals are dissolved. The iron, calcium, magnesium and aluminum oxides are insoluble in the chlorides solution. After leaching and residue filtration, the solution is purified by cementation using zinc granules or powder. After removal of the cement, consisting of lead, copper, silver and cadmium, the purified solution is fed to the electrolysis cell.

Apparently, the electrolysis of the zinc amino complex in the purified solution occurs in a conventional open cell using a titanium permanent blank cathode and a proprietary graphite anode. In the electrolysis cell, the zinc plates on the titanium cathode. However, the deposition time for the zinc is 24 to 48 hours, depending on the current density. In addition to the electrowinning of zinc, the electrolysis cell consumes ammonia and evolves nitrogen. Because of this, in order to maintain the pH of the electrolyte in the desired range of 6 to 6.5, additional ammonium must be added to the cell in the range of 180 kg per tonne of product zinc.

Although the Engitec process appears to be theoretically possible, the use of an electrolysis cell adds additional costs to the process due to the energy consumption of an electrolysis cell, the consumption of ammonia in the electrolysis cell, additional costs in handling nitrogen evolved in the electrolysis cell, and the cost of maintaining the components of the electrolysis cell itself. For example, the titanium cathode as well as the apparently proprietary graphite anode may be costly. The Engitec process also results in the formation of metallic zinc. Although metallic zinc has a certain value, zinc oxide has more value. The residue removed from the Engitec process is composed primarily of iron oxide and zinc ferrite. Iron oxide can be used in the steel making process. The presence of zinc ferrite likely is not a significant detriment to the use of the residue from the Engitec process, but it does inject an additional impurity into any future process. It would be more advantageous to obtain a residue comprising primarily iron oxide with no zinc ferrite or other impurities, or only an insignificant amount of such other impurities.

The electrowinning of metals from chloride solutions is known in the art. U.S. Pat. No. 4,155,821 to Grontoft discloses and claims a method for recovering chlorine using electrolytic separation. Chlorine and metal are produced from a chlorine containing electrolyte by an electrolytic process having an anode surrounded by a membrane connected to a hood. The process is maintained at a partial vacuum so that any chlorine gas generated by the anode together with some of the electrolyte is drawn away from the anode. The vacuum also is devised to control rediffussion of chlorine containing electrolyte back through the membrane into the surrounding electrolyte. The process is for use with nickel recovery where the nickel chloride containing electrolyte is introduced at such a rate that the pH is maintained below a certain level. The process also may be used for cobalt recovery.

The electodeposition of zinc from chloride solutions also is known in the art. U.S. Pat. No. 4,292,147 to Fray discloses and claims a method for the electrodeposition of cadmium or zinc from chloride solutions derived from chlorine leaching of materials. An aqueous solution having 15 to 30% by weight of zinc or cadmium chloride is electrolyzed at a pH of 2 to 3.5 at a temperature of below 35° C. with gas agitation at a current density above 100 A/m$^2$ to form coherent zinc or cadmium at the cathode. A typical zinc containing material such as flue dust is leached with a saturated chlorine solution, preferably in the presence of chlorine hydrate. The zinc chloride solution preferably contains 20 to 30% by weight zinc or cadmium chloride and up to 20% by weight alkaline metal or ammonium chloride. The electrolysis preferably is carried out at 0° C. to 9° C. and above 2500 A/m$^2$ with intermittent current reversal. Chlorine hydrate liberated at the anode may be recycled to affect leaching.

Thus, there exists a need for a method which will recover zinc products, including zinc metal and zinc oxide, from industrial waste which results in a product the majority of which is either zinc or zinc oxide, and not mixtures of zinc oxide and other zinc phases. The method disclosed below relates to the preparation of zinc metal or essentially pure zinc oxide. In addition, since zinc products, specifically zinc metal and zinc oxide, are the desired products and diamino zinc dichloride is undesired, the method disclosed herein demonstrates how to increase the formation of desired zinc products and decrease the formation of diamino zinc dichloride.

Further, there exists a need for a method which will allow the recovery of elemental lead, cadmium, and other metals from industrial waste streams by allowing the powdered zinc dust to remain dispersed in the solution so as to minimize the amount of zinc dust needed to remove lead, cadmium and other metals. Minimizing the amount of zinc dust required increases the economy of the process first by reducing the quantity of zinc needed, second by reducing the mass of material to be processed, and third by allowing the removal of a proportionally greater quantity of lead and cadmium.

Additionally, there exists a need for a method which will allow the recovery of iron oxide from industrial waste streams which can be used with little or no additional treatment as the feedstock for other processes. Producing an iron oxide with a minimum amount of impurities, such as zinc ferrite, is advantageous because the iron oxide can be used as the feedstock for steel production processes. A method which results in the recovery of iron oxide would have additional value in that the iron oxide could be sold for use in other processes.

Moreover, there exists a need for a method which will allow the separation and recovery of essentially pure elements such as lead and cadmium which occur as byproducts of the zinc recovery process. Recovery of these byproducts has the advantage of reducing the overall volume of waste, while at the same time, producing economically valuable product.

BRIEF SUMMARY OF THE INVENTION

The present invention satisfies these needs in a method which recovers essentially pure zinc oxide from waste material containing zinc or zinc oxide and then further treats and recovers a quantity of high quality lead and cadmium from the waste material. Along with the essential pure zinc oxide, zinc metal can be recovered, along with values of other metallic elements contained in the waste material such as lead, silver, and cadmium. The solutions used in the process are recycled such that the process does not have any liquid wastes. The solids recovered from the process, namely, the zinc oxide, zinc, metal values, and other residues all can be used in other processes. Several such residues, including the iron oxide cake, lead metal residue, and cadmium are of such quality that they can be used directly as raw material for production of a variety of goods.

Briefly, the waste material, typically a fly ash or flue dust such as EAF, is leached with an ammonium chloride solution resulting in a product solution and undissolved materials. The product solution and the undissolved materials are separated, with both the product solution and the undissolved materials being further treated to recover valuable components. Zinc metal is added to the product solution to cement out any lead and cadmium contained in the product solution. The remaining product solution is rich in zinc compounds.

The remaining product solution then can be treated in two manners. First, the remaining product solution can be cooled thereby precipitating the zinc components from the product solution as a mixture of crystallized zinc compounds. These crystallized zinc compounds are separated from the product solution, washed and then dried at elevated temperatures, resulting in a zinc oxide product of 99% or greater purity. Second, the remaining product solution can be subjected to electrolysis in which zinc metal plates onto the cathode of the electrolysis cell. Any remaining product solution after crystallization or electrolysis is recycled back to treat incoming waste material.

The undissolved material separated from the product solution is rich in iron oxide, and typically has some impurities such as zinc ferrite. The undissolved materials can be used as a feedstock for steel mills so long as the quantity of impurities is not too great. It is preferable, however, to remove the impurities from the iron oxide prior to using the iron oxide as a feedstock. Even more preferably, reducing the iron oxide to direct-reduced iron (DRI) is desired as DRI can be used to replace part or all of the steel scrap charge.

The iron oxide in the undissolved materials can be reduced to DRI in two manners. First, carbon, in the form of activated carbon, carbon dust, carbon pellets or the like, can be introduced to the ammonium chloride and waste material mixture during the leaching process. The carbon reduces the iron oxide resulting in DRI. Second, the carbon can be introduced to the dried undissolved material cake using a ribbon blender. The carbon will react with the iron oxide, reducing the iron oxide to DRI. Adding heat to this process assists in the reduction.

Prior to be leached by the ammonium chloride solution, the waste material, typically including franklinite and magnetite, may be roasted at temperatures greater than 500° C. for a predetermined period of time. The roasting causes a decomposition of the franklinite zinc oxide-iron oxide complex into zinc oxide, iron oxide and other components. The roasting process generally comprises the steps of adding heat to the waste material and/or passing heated reducing gases through the waste material. Although all reducing gases are suitable, hydrogen and carbon-containing gases such as carbon dioxide are preferred, as well as mixing carbon (activated) with the material and roasting in a gas containing oxygen. While some iron oxide is reduced from $Fe_2O_3$ and $Fe_3O_4$ to FeO, no elemental iron is produced during the roasting step. Additionally, iron and iron oxides are not soluble to any degree in the basic ammonium chloride solution.

In the cementation step, lead, cadmium and copper plate out on zinc particles introduced into the solution, thereby forming a cake of waste metals which is filtered and removed from the solution. This waste metals cake may be further processed to separate and purify component elements such as lead and copper, which may then be sold as products. The waste metal cake is washed with water and transferred to a vessel containing sulfuric acid. The sulfuric acid will dissolve zinc, cadmium and copper present in the waste metal cake. Lead metal, however, is not soluble in sulfuric acid and any lead oxide present in the cake will dissolve and reprecipitate as lead sulfate. The resulting solid is filtered, washed with water, and dried under nitrogen. This solid is mainly lead metal having trace impurities of lead oxide, lead sulfate, copper, zinc and cadmium. This lead metal may be resold, and is suitable for a variety of uses. The remaining sulfuric acid solution contains cadmium and zinc with small amounts of copper. The cadmium may be removed electrochemically by placing zinc metal sheets in the solution to produce a cadmium sponge, which is suitable for resale as a product. Alternatively, electrolysis can be used to recover the cadmium. The remaining solution is mainly zinc and sulfuric acid, which may be recycled into the primary leach solution to eventually recover the zinc as zinc oxide.

The present process is a method by which the EAF dust can be heated in a reducing atmosphere to reduce the iron-zinc spinel into zinc oxide and iron oxide typically prior to leaching with ammonium chloride. An initial leach of the waste material can be done, followed by the roasting followed by another leach. The present process uses dispersants in the ammonium chloride solution to keep the zinc powder from clumping and thus increasing the efficiency of the cementation process. The present process is a method which minimizes the formation of the diamino zinc dichloride, thus improving the washing step. In addition, the effect of cooling profile on the particle size allows particle size control in the present process. The present process also provides that the wash water stream must also be recycled as well as the steady state conditions which will be achieved with the recycle.

In the leaching step, the zinc and/or zinc oxide dissolves in the ammonium chloride solution along with other metal oxides contained in the waste material, such as lead oxide and cadmium oxide. The resultant solution is filtered to remove the undissolved materials, such as iron oxides and inert materials such as silicates, which will not dissolve in the ammonium chloride solution. Finely powdered zinc metal can be added to the resultant solution at a temperature of about 90° C. or above. A dispersant may be added at this point to prevent the finely powdered zinc metal from flocculating and becoming less effective. Through an electrochemical reaction, lead metal and some cadmium plates out on the surface of the zinc metal particles. The addition of sufficient powdered zinc metal results in the removal of virtually all of the lead and cadmium from the resultant solution. The resultant solution is filtered to remove the solid lead, zinc and cadmium. These initial steps, with the exception of adding the dispersant, have been generally disclosed in the prior art, yet have not resulted in the production of essentially pure zinc oxide.

The filtrate then is cooled to a temperature of between about 20° C. and 60° C. resulting in the crystallization of a mixture of zinc compounds. The crystallization step helps to achieve a high purity zinc oxide of controlled particle size. During the crystallization step, the filtrate can be cooled to its final temperature by controlling the cooling profile. The use of a reverse natural cooling profile is preferred as its results in a more desirable nucleation to crystal growth ratio. The filtrate contains a significant amount of diamino zinc dichloride, or other complex compounds which involve zinc amino complexes, as well as hydrated zinc oxide and hydroxide species. The solid precipitate is filtered from the solution, the solution recycled, and the solid precipitate washed with water at a temperature between about 25° C. and 100° C. The diamino zinc dichloride dissolves in the wash water leaving the majority of the hydrated zinc oxide species as the precipitated solid. The precipitated solid then is filtered from the solution, the resulting solution being recycled, and the solid precipitate placed in a drying oven at a temperature above 100° C. and preferably between about 100° C. and 350° C., resulting in a dry white zinc oxide powder. These additional steps allow the production and recovery of substantially pure zinc oxide. Alternatively, the filtrate can be subjected to electrolysis to recover zinc metal. Lead, zinc, and cadmium removed during the cementation step may be separated and purified through further processing to recover products suitable for resale.

Therefore, it is an object of the present invention to provide a method for recovering zinc oxide from waste materials, such as fly ash or flue dust, which contain other metals, such as iron oxide, lead oxide, cadmium and other materials.

Yet another object of the present invention is to provide a method for recovering zinc oxide in which all leaching and washing solutions are recycled for further use, and no leaching or washing solutions are disposed of into the sewers or the environment.

Still another object of the present invention is to provide a method for recovering zinc oxide which also results in the precipitation in elemental form of any lead and cadmium metals contained in the starting materials.

It is another object of the present invention to provide a method for recovering zinc oxide in which all of the zinc can be recycled so that all of the zinc eventually will be converted to zinc oxide.

Yet another object of the present invention is to provide a method for recovering zinc oxide in which the powdered zinc dust added to the intermediate solutions is kept dispersed using water soluble polymers which act as antiflocculants or dispersants.

A further object of the present invention is to provide a method for recovering zinc metal from waste materials, such as fly ash or flue dust, using electrolysis.

An additional object of the present invention is to provide a method for recovering zinc metal from a waste material stream which has been leached with ammonium chloride.

Still another object of the present invention is to provide a method for recovering iron oxide from waste materials, such as fly ash or flue dust, which contain other metals, such as zinc, lead oxide, and cadmium.

A further object of the present invention is to provide a method for recovering iron oxide which can be used as is as a feedstock for steel production processes.

Another object of the present invention is to provide a method for producing direct-reduced iron from iron oxide recovered as a residue from an ammonium chloride leached waste material, such as fly ash or flue dust.

Yet another object of the present invention is to provide a method for the separation and purification of lead and cadmium contained in the waste materials, such that these metals may be recovered and resold.

A final object of the present invention is to provide a method for recovering zinc metal, zinc oxide and/or iron oxide which is economical, quick and efficient.

These objects and other objects, features and advantages of the present invention will become apparent to one skilled in the art when the following Detailed Description of a Preferred Embodiment is read.

DETAILED DESCRIPTION OF A PREFERRED EMBODIMENT

The method for recovering zinc metal, zinc oxide, iron oxide, lead and cadmium disclosed herein is carried out in its best mode in recovering these materials from the waste streams of industrial or other processes. A typical industrial waste stream used is a flue gas where the charge contains galvanized steel, having the following percent composition:

TABLE I

Analysis of Flue Dust

| Component | Weight Percent |
|---|---|
| zinc oxide | 39.64 |
| iron oxide | 36.74 |
| lead oxide | 5.72 |
| inert materials[1] | 9.10 |
| calcium oxide | 2.80 |
| potassium oxide | 2.41 |
| manganese oxide | 1.29 |

TABLE I-continued

Analysis of Flue Dust

| Component | Weight Percent |
|---|---|
| tin oxide | 1.13 |
| aluminum oxide | 0.38 |
| magnesium oxide | 0.33 |
| chromium oxide | 0.16 |
| copper oxide | 0.06 |
| silver | 0.05 |
| unidentified materials[2] | 0.22 |
| TOTAL | 100.00 |

[1]siliceous material, such as slag, with carbon granules occluded.
[2]molybdinum, antimony, indium, cadmium, germanium, bismuth, titanium, nickel and boron.

GENERAL PROCESS DESCRIPTION

Generally, the present process is a continuous method for the recovery of zinc oxide from waste material streams which comprise zinc compounds, comprising the steps of:

a. roasting the waste material at an elevated temperature and in a reducing atmosphere;

b. treating the waste material with an ammonium chloride solution at an elevated temperature to form a product solution which comprises dissolved zinc and dissolved zinc oxide whereby any iron oxide in the waste material will not go into solution;

c. separating the product solution from any undissolved materials present in the product solution including any of the iron oxide;

d. adding zinc metal and a dispersant to the product solution whereby any lead and cadmium ions contained within the product solution are displaced by the zinc metal and precipitate out of the product solution as lead and cadmium metals and the dispersant is selected from the group consisting of dispersants which will prevent the aggregation of said zinc metal;

e. separating the product solution from the lead and cadmium metals which may be subjected to further processing, thus allowing their purification and recovery;

f. lowering the temperature of the product solution thereby precipitating the zinc component as a mixture of crystallized zinc compounds;

g. separating the precipitated zinc compounds from the product solution;

h. washing the zinc compounds solids with a wash water thereby solubilizing certain of the zinc compounds;

i. separating the remaining zinc compounds solids from the solution; and then j. drying the remaining zinc compounds solids at a temperature of at least 100° C. whereby the resulting product is zinc oxide of 99% or greater purity.

The present process also can comprise a two-stage leaching process for even greater yields of zinc oxide. The two-stage process comprises the steps of:

a. treating the waste material a first time with an ammonium chloride solution at an elevated temperature to form a first product solution which comprises dissolved zinc constituents whereby any iron oxide in the waste material will not go into solution;

b. separating the first product solution from the undissolved waste material compounds present in the first product solution including any of the iron oxide;

c. roasting the undissolved waste material compounds at an elevated temperature and in a reducing atmosphere;

d. treating the roasted undissolved waste material compounds a second time with the ammonium chloride solution at an elevated temperature to form a second product solution which comprises dissolved zinc constituents whereby any iron oxide remaining in the roasted undissolved waste material compounds will not go into solution;

e. combining the first and second product solutions to form a combined product solution, maintaining the combined product solution at a temperature of at least 90° C., and adding powdered zinc metal and a dispersant to the combined product solution whereby any lead and cadmium ions contained within the combined product solution are displaced by the zinc metal and precipitate out of the combined product solution as lead and cadmium metals and the dispersant is selected from the group consisting of dispersants which will prevent the aggregation of the zinc metal; and f. separating the combined product solution from the lead and cadmium metals.

After the combined product solution is separated from the lead and cadmium metals, the combined product solution is treated similarly to the treatment of the product solution in steps f through j of the general method disclosed above.

An ammonium chloride solution in water is prepared in known quantities and concentrations. If the two-stage leaching process is used, the feed material which contains the zinc species, such as the waste material flue dust described in Table I or any other feed material source which contains zinc or zinc oxide mixed with other metals, is added to the ammonium chloride solution at a temperature of about 90° C. or above. Otherwise, the feed material is roasted. The zinc and/or zinc oxide dissolves in the ammonium chloride solution along with other metal oxides, such as lead oxide and cadmium oxide. The iron oxide does not dissolve in the ammonium chloride solution. The solubility of zinc oxide in ammonium chloride solutions is shown in Table II.

TABLE II

Solubility of ZnO in 23% $NH_4Cl$ Solution

| Temperature °C. | g Dissolved/100 g $H_2O$ |
| --- | --- |
| 90 | 14.6 |
| 80 | 13.3 |
| 70 | 8.4 |
| 60 | 5.0 |
| 50 | 3.7 |
| 40 | 2.3 |

It has been found that a 23% by weight ammonium chloride solution in water at a temperature of at least 90° C. provides the best solubility of zinc oxide. Concentrations of ammonium chloride below about 23% do not dissolve the maximum amount of zinc oxide from the flue dust, and concentrations of ammonium chloride above about 23% tend to precipitate out ammonium chloride along with the zinc oxide when the solution is cooled. Therefore, 23% has been chosen as the preferred ammonium chloride solution concentration. Iron oxide and inert materials such as silicates will not dissolve in the preferred solution.

The zinc oxide, as well as smaller concentrations of lead or cadmium oxide, are removed from the initial dust by the dissolution in the ammonium chloride solution. The solid remaining after this leaching step contains zinc, iron, lead and cadmium, and possibly some other impurities. The remaining solid then is roasted in a reducing atmosphere, typically at a temperature greater than 420° C. and often at 700° C. to 900° C. The reducing atmosphere can be created by using hydrogen gas, simple carbon species gases such as carbon dioxide, or by heating the material in an oxygen containing gas in the presence of elemental carbon. The carbon preferably is in the form of dust or pellets. Typical roasting times are from 30 minutes to 4 hours. As discussed above, the waste dust first may be roasted and second may be leached, omitting the first leaching step.

After the dust has been roasted, it is subjected to a leaching step in 23% by weight ammonium chloride solution in water at a temperature of at least 90° C. Any zinc or zinc oxide formed during the roasting step dissolves in the ammonium chloride solution. The zinc oxide and ammonium chloride solution then is filtered to remove any undissolved material, including the iron oxide. After filtering, for analysis, the solid may be separated out and dried at a temperature of over 100° C., typically between 100° C. and 200° C., for about 30 minutes to 2 hours, typically approximately 1 hour.

To recover the zinc oxide, while the filtered zinc oxide and ammonium chloride solution is still hot, that is at a temperature of 90° C. or above, finely powdered zinc metal is added to the solution. Through an electrochemical reaction, any lead metal and cadmium in solution plates out onto the surfaces of the zinc metal particles. The addition of sufficient powdered zinc metal results in the removal of virtually all of the lead of the solution. The solution then is filtered to remove the solid lead, zinc and cadmium.

Powdered zinc metal alone may be added to the zinc oxide and ammonium chloride solution in order to remove the solid lead and cadmium. However, the zinc powder typically aggregates to form large clumps in the solution which sink to the bottom of the vessel. Rapid agitation typically will not prevent this aggregation from occurring. To keep the zinc powder suspended in the zinc oxide and ammonium chloride solution, any one of a number of water soluble polymers which act as antiflocculants or dispersants may be used. In addition, a number of surface active materials also will act to keep the zinc powder suspended, as will many compounds used in scale control. These materials only need be present in concentrations of 10–1000 ppm. Various suitable materials include water soluble polymer dispersants, scale controllers, and surfactants, such as lignosulfonates, polyphosphates, polyacrylates, polymethacrylates, maleic anhydride copolymers, polymaleic anhydride, phosphate esters and phosponates. A discussion of these various materials can be found in the literature, such as Drew, Principles of Industrial Waste Treatment, pages 79–84, which is incorporated herein by reference. Flocon 100 and other members of the Flocon series of maleic-based acrylic oligomers of various molecular weights of water soluble polymers, produced by FMC Corporation, also are effective. Adding the dispersants to a very high ionic strength solution containing a wide variety of ionic species is anathema to standard practice as dispersants often are not soluble in such high ionic strength solutions.

This cementation step is preferably carried out by adding approximately two times the stoichiometric amount of zinc and dispersant. After this initial striking step, the lead, cadmium and copper concentration remaining in the solution is monitored. A second polishing step may then be performed by adding a small amount of powdered zinc and dispersant as necessary.

At this stage there is a filtrate rich in zinc compounds and a precipitate of lead, cadmium and other products. The filtrate and precipitate are separated, with the precipitate being further treated, as hereinafter disclosed, to capture chemical values. The filtrate may be treated in several manners, two of which are preferred. First, the filtrate may be cooled resulting in the crystallization and recovery of zinc oxide. Second, the filtrate may be subjected to electrolysis resulting in the generation and recovery of metallic zinc.

To recover zinc oxide, the filtrate then is cooled to a temperature of between about 20° C. and 60° C. resulting in the crystallization of a mixture of zinc compounds. The mixture contains a significant amount of diamino zinc dichloride, or other complex compounds which involves zinc amino complexes, hydrated zinc oxides and hydroxide species. Crystallization helps to achieve a high purity zinc oxide of controlled particle size, typically through control of the temperature-time cooling profile. Reverse natural cooling, that is cooling the solution slower at the beginning of the cooling period and faster at the end of the cooling period, is preferred to control the nucleation to crystal growth ratio and, ultimately, the crystal size distribution. The precipitated crystallized solid is filtered from the solution and washed with water at a temperature of between about 25° C. and 100° C. The filtered solution is recycled for further charging with feed material. The diamino zinc dichloride dissolves in water. The solubility of diamino zinc dichloride in water is shown in Table III.

TABLE III

| Solubility of $Zn(NH_3)_2Cl_2$ in water | |
|---|---|
| Temperature °C. | g Dissolved/100 g $H_2O$ |
| 90 | 32 |
| 80 | 24 |
| 40 | 21 |
| 25 | 12.8 |

Very little of the hydrated zinc oxide dissolves in the water. This resultant solution then is filtered to remove the hydrated zinc oxide species. The solid hydrated zinc oxide species filtered from the solution is placed in a drying oven at a temperature of over 100° C. After a sufficient drying period, the resultant dry white powder is essentially pure zinc oxide. The filtrate from the solution is recycled for charging with additional zinc compound mixture.

The zinc oxide may be dried at approximately 100° C. To ensure that the material is free of chloride, however, it is preferable to heat the zinc oxide to a higher temperature. Diamino zinc dichloride decomposes at 271° C. and ammonium chloride sublimes at 340° C. Therefore, heating the zinc oxide to a temperature above 271° C. is useful. The drying temperature should be kept below approximately 350° C. to prevent the sublimation of significant amounts of ammonium chloride. Therefore, it is preferable to dry the zinc oxide at a temperature in the range of 271° C. to 350° C. Typically, the zinc oxide should be dried in this temperature range for approximately 2 to 60 minutes, and preferably from 5 to 20 minutes. A 10 minute drying time has been found to be a satisfactory average.

As the zinc, lead and cadmium contained in the feed materials are amphoteric species, by using ammonium chloride solution these species will go into solution, while any iron oxide present in the feed material will not go into solution. Other solutions, such as strong basic solutions having a pH greater than about 10 or strong acidic solutions having a pH less than about 3, also can be used to dissolve the zinc, lead and cadmium species; however, if strong acidic solutions are used, iron oxide will dissolve into the solution, and if strong basic solutions are used, iron oxide will become gelatinous. The lead and cadmium can be removed from the ammonium chloride solution through an electrochemical reaction which results in the precipitation of lead and cadmium in elemental form. The difference in solubility between diamino zinc dichloride and zinc oxide in water and in ammonium chloride solutions allows the selective dissolution of the diamino zinc dichloride such that pure zinc oxide can be recovered. This also can be used in the crystallization step to improve the relative amounts of diamino zinc dichloride and zinc oxide species form. Significantly, all of the zinc can be recycled so that all of the zinc eventually will be converted into zinc oxide.

The crystallization step of the present process can be done continuously in order to increase the throughput and maximize the zinc oxide yield after the washing and drying step.

The following Examples demonstrate ways to increase the formation of zinc oxide according to the present invention. Examples 1–7 do not include roasting and Examples 8–13 include roasting. Examples 10–12 also show variations on the crystallization step, and Example 13 also illustrates the recycle results.

EXAMPLE 1

Prior Art

A metal dust of composition listed in Table I of the Burrows patent is added to 23% by weight $NH_4Cl$ solution (30 g $NH_4Cl$ per 100 g $H_2O$), as discussed in the Burrows patent, in the amount of 1 gram of dust per 10 grams of solution. The solution is heated to a temperature of 90° C. and stirred for a period of 1 hour, during which the zinc oxide in the dust dissolves. The remaining solid, which has a composition of approximately 60% iron oxide, 5% calcium oxide, 5% manganese, 30% other materials, is filtered out of the solution. Powdered zinc then is added to the filtrate at 90° C., causing the precipitation of waste metals, the precipitate containing about 60% lead, 40% zinc, 2% cadmium and 8% other metals. The waste metals then are filtered out and the filtrate is cooled to room temperature (between about 18° C. and 30° C.) over a period of about two hours. The solution then contains a white precipitate which is not essentially pure zinc oxide but is a mixture of hydrated zinc phases and diamino zinc dichloride.

EXAMPLE 2

A metal dust of composition listed in Table I is added to 23% weight $NH_4Cl$ solution (30 g $NH_4Cl$ per 100 g $H_2O$). 1 gram of dust is used per 10 grams of solution. The solution is heated to a temperature of 90° C. and stirred for a period of 1 hour. During this period the zinc oxide in the dust dissolves. The remaining solid, having a composition of approximately 60% iron oxide, 5% calcium oxide, 5% manganese, 30% other materials, is filtered out of the solution. Powdered zinc then is added to the filtrate at 90° C. This causes the precipitation of waste metals, the waste metal precipitate containing about 60% lead, 40% zinc, 2% cadmium and 8% other metals. The waste metals then are filtered out and the filtrate is cooled to room temperature (between about 18° C. and 30° C.) over a period of about two hours. The solution then contains a white precipitate.

The precipitate is a mixture of hydrated zinc phases and diamino zinc dichloride. The hydrated zinc phases are virtually insoluble in water; however, the measurements in Table III show that diamino zinc dichloride is quite soluble in water. A portion of the white precipitate was dried and zinc oxide and diamino zinc dichloride, as well as some other components, are present. The white precipitate then is filtered from the solution and resuspended in water at 90° C. and stirred for a period of one hour. This suspension then is filtered and product dried in an oven at 140° C. The resulting white solid is 99%+zinc oxide. The amount of zinc oxide obtained was 47.8% of the mass of the original precipitate.

The ZnO recovered by this Example also had the following components:

| | |
|---|---|
| lead: | 866 ppm |
| Potassium: | 45 ppm |
| calcium: | <25 ppm |
| manganese: | <25 ppm |
| chromium: | <25 ppm |

EXAMPLE 3

The procedure of Example 1 is followed until the step in which the zinc containing filtrate is cooled. Since the diamino zinc dichloride is more soluble then the majority of the other possible precipitates in the ammonium chloride solution (except for zinc chloride which is so soluble that it will not appear), the diamino zinc dichloride appears as a larger fraction of the solid as the temperature declines. The filtrate was divided into fractions and each fraction cooled to a different temperature. The resulting solids were than filtered, resuspended in water at 90° C. for one hour, filtered and dried. The result was 99%+zinc oxide in all cases; however, the yield changed with the temperature to which the fraction was cooled as follows:

| Crystallization Temp (°C.) | Percent ZnO Obtained |
|---|---|
| 75 | 65 |
| 70 | 60 |
| 60 | 60 |
| 50 | 50 |

Crystallization at temperatures from 60° C. up improve the yield of ZnO.

EXAMPLE 4

ZnO also can be recovered from the wash water used in the process. Fifty grams of dried zinc phase precipitate (the solid obtained after cooling to room temperature) obtained using the procedure of Example 1 is added to 100 g of $H_2O$ at 90° C. The diamino zinc dichloride dissolves while only a small amount of the other zinc phases dissolve (due to the ammonium chloride which is part of the diamino zinc dichloride). The remaining solid is filtered out and is dried resulting in 99%+zinc oxide. The filtrate is cooled to room temperature and the solid filtered out. The solid is again a mixture of hydrated zinc phases and $Zn(NH_3)_2Cl_2$. The solid is washed in 90° C. water, filtered and dried resulting in 99% ZnO. The yield is 40% ZnO.

The yield also can be improved by crystallizing at higher temperatures. In addition, the same wash water can be used again instead of fresh water since this part of the process relies on the change in $Zn(NH_3)_2$ solubility with temperature.

EXAMPLE 5

The source of the zinc does not have to be dust. If pure ZnO is added to a 23% $NH_4Cl$ solution, the result is the same. As an example, saturated solutions of ZnO in 23% ammonium chloride solutions were prepared at temperatures ranging from 40° C.–90° C., using the solubility data of Table II. These solutions were then cooled to room temperature over a period of 1–2 hours. The resulting solid was filtered, washed in 90° C. water, and dried. As before, the original solid was a mixture of hydrated zinc phases and diamino zinc dichloride, the final product was 99% ZnO. The yields obtained as a fraction of the original solid precipitate are listed below:

| Temperature (°C.) | ZnO Added (g) | ZnO Obtained in Product (%) |
|---|---|---|
| 90 | 14.6 | 64 |
| 80 | 13.2 | 62 |
| 70 | 8.4 | 60 |
| 60 | 5.0 | 60 |
| 50 | 3.7 | 45 |
| 40 | 2.3 | 40 |

These results indicate that the yield of ZnO improves as the amount of dissolved ZnO increases (which also means higher temperatures).

These results indicate that the yield of ZnO improves as the amount of dissolved ZnO increases (which also means higher temperatures).

EXAMPLE 6

This example shows the present procedure run in a continuous crystallization process to increase the throughput and to maximize the zinc oxide yield. The procedure of Example 1 is followed until the step in which the waste metals are precipitated out of the zinc oxide containing solution. Fifty gallons of the solution are used as the feedstock for a continuous crystallization process. The solution, initially at about 90° C., is pumped into a 1-gallon jacketed crystallizer equipped with baffles and a draft tube at a rate of 1 gallon per hour. The crystallizer jacket temperature is maintained at about 55° C. by use of a constant temperature circulating bath. The solution and the product crystals are removed continuously so as to keep the volume of material present in the crystallizer constant. At steady state, the temperature in the crystallizer is maintained at about 60° C. The product solution flows through a filter which collects the solid. The solid product then undergoes the washing and drying steps as discussed in Example 2. The yield of zinc oxide from this continuous crystallization process is about 60% of the total mass of the solid crystallized.

The crystallizer can be operated at lower temperatures; however, lower temperatures decrease the final yield of zinc oxide obtained as shown in Example 3. The flow rate employed also can be altered along with the crystallizer jacket temperature to minimize crystallization on the crystallizer vessel walls. In addition, these variables, along with the crystallizer jacket temperature, can be used to alter the crystal size distribution.

EXAMPLE 7

Metal dust of the composition shown in Table I is digested in 23% ammonium chloride solution at about 90° C. One gram of zinc metal dust is used per 10 grams of ammonium chloride solution. After one hour, the remaining solid is filtered out of the solution. 500 cc of the solution is put into each of two vessels with stirrers and the temperature of the solutions is maintained at 90° C. 500 ppm of Flocon 100 is added to one of the vessels, while nothing is added to the other vessel. Four-tenths of a gram (0.4 g) of 200 mesh zinc dust then is added to each of the two solutions. In the solution containing the Flocon 100, the zinc dust remains suspended, while in the other solution containing no additive, the zinc dust clumps together (flocculates). After one hour at about 90° C., the solids are filtered out of each of the solutions, weighed and analyzed. The mass of solid from the solution which contained the dispersant was 1.9 grams and comprised approximately 21% zinc, 75% lead, 2% cadmium and the remaining amount other metals. The mass of solid obtained from the solution with no dispersant was 1.2 grams and comprised approximately 33% zinc, 63% lead, 2% cadmium and the remaining amount other metals. From this example, it can be seen that the additional step of adding a dispersant increases the amount of lead and other metals removed from the waste stream in solution.

ROASTING STEP FOR ENHANCED ZINC RECOVERY

The zinc dust obtained from various sources have shown by chemical analysis to contain from 20%–25% zinc by weight. Certain crystalline phases exist in this dust, specifically zinc oxide. The positive identification of the iron phase is complicated by the possible structural types (i.e. spinel type iron phases showing almost identical diffraction patterns). The zinc oxide (as well as smaller concentrations of lead or cadmium oxide) are removed from the initial dust by dissolution in a concentrated ammonium chloride solution (23% ammonium chloride).

Filtration and washing of the undissolved species leaves a residual powder. This powder shows a zinc concentration that is still elevated (i.e., 10–13% by weight), but that is not zinc oxide. All crystalline phases can be identified by spinel type phases. This powder is a combination of franklinire (Fe, Mn, Zn)(FeMn)$_2$O$_4$, and magnetite (iron oxide: Fe$_3$O$_4$). Both of these phases have very similar spinel type structures. The zinc within the franklinite, cannot be removed by dissolution with ammonium chloride. In addition, no simple extraction process will remove zinc from this stable oxide phase. Although this compound is very stable to oxidation (all elements in the highest oxidation state), it is relatively easy to destroy this compound by reduction at elevated temperatures. The reduction of the franklinite in an atmosphere that cannot readily reduce zinc oxide or allow for the rapid oxidation of zinc to zinc oxide following reduction and subsequently recover the zinc oxide by ammonium chloride extraction or sublimation (the highly volatile zinc oxide will sublime from the mixture at relatively low temperatures and recondense at the cold locations of the roaster). The alterative will be complete reduction of the franklinite to zinc metal and removal by distillation or separation of the molten zinc by settling techniques.

1. Roasting Process

The roasting step, as mentioned above, can be carried out prior to the initial leaching step, or between a first and second leaching step. The powder containing the franklinite and magnetite, such as the waste dust, is heated to temperatures greater than 500° C. This temperature causes a reaction which causes a decomposition of the stable franklinite phase into zinc oxide and other components, and yet does not allow for the complete reduction of zinc oxide to zinc metal. The resulting zinc oxide can be removed by sublimation or extraction with an ammonium chloride solution, such as by following the steps detailed above under the general process. The resulting material after extraction has less than 1% by weight zinc.

The dust can be roasted using many conventional roasting processes, such as, for example, direct or indirect heating and the passing of hot gases through the dust. For example, non-explosive mixtures of reducing gases, such as for example hydrogen gas and nitrogen or carbon dioxide, can be passed through the powder containing franklinite and magnetite. Hydrogen gas is not the only species that may be used for reductive decomposition of franklinite. It is possible to use carbon or simple carbon containing species, including carbon-containing reducing gases and elemental carbon. Heterogeneous gas phase reductions are faster than solid state reductions at lower temperatures and therefore suggest the use of carbon monoxide. The carbon monoxide can be generated in situ by mixing the franklinite powder with carbon and heating in the presence of oxygen at elevated temperatures. The oxygen concentration is controlled to optimize CO production. The carbon monoxide may be introduced as a separate source to more clearly separate the rate of carbon monoxide preparation from the rate of Franklinite decomposition. The prepared zinc oxide then can be removed by either ammonium chloride extraction or sublimation.

The roasting process also can be performed to complete reduction by using carbon at high temperatures and collecting zinc metal that will melt at very low temperatures (420° C.) and boil at 907° C. In this process, zinc metal is obtained that, if desired, can be converted readily to the oxide by air roasting.

EXAMPLE 8

A dust containing 19.63% Zn, 27.75% Fe, 1.31% Pb, 9.99% Ca, and 0.024% Cd (analysis based on elements not oxides) was leached at 100° C. in a 23% ammonium chloride solution. The solid remaining after the leaching process was dried and analyzed to contain 12.67% Zn, 4.6% Ca, 35.23% Fe, 0.7% Pb, and 0.01% Cd. This material was placed in a quartz boat in the presence of activated carbon and heated at 900° C. for two hours in an atmosphere of 95% N$_2$ and 5% O$_2$. After two hours, the material was removed and added to a 23% ammonium chloride solution at 100° C. The material was filtered and dried at 140° C. for one hour to determine its composition. Analysis of this remaining solid was 42.84% Fe, 0.28% Zn,<0.1% Pb, and <0.01% Cd. The leached-roasted-leached material then can be subjected to the remainder of the general process to recover zinc oxide.

EXAMPLE 9

A dust with composition given in Table I is leached in 23% ammonium chloride solution for 1 hour at 100° C. The solid remaining (which contained 14% Zn) was placed in a quartz boat and heated to 700° C. in an atmosphere of 8% H$_2$ and 92% Ar. The material was cooled and reheated at 100° C. in 23% ammonium chloride solution at 100° C. The solid was separated, dried and analyzed for zinc. The zinc was found to be less than 1%. The leached-roasted-leached material then can be subjected to the remainder of the general process to recover zinc oxide.

2. Crystallization Step Variations

The purpose of the crystallization/washing step is to produce a high purity zinc oxide of controlled particle size. This is accomplished through control of the temperature-time profile during cooling in the crystallization.

The crystallization step in the process takes the filtrate from the cementation step at 90°–100° C. This filtrate contains the dissolved zinc with small amounts of trace impurities such as lead and cadmium. In order to prepare a pure zinc oxide it is necessary to prevent the formation of solvent inclusions inside the grown crystals. Solvent inclusions are pockets of liquid trapped as a second phase inside the crystals. Control of crystallization conditions can be employed to reduce these impurities. An example is given below.

EXAMPLE 10

A dust of the composition given in Table I is taken through the leaching and cementation steps. After cementation the filtrate is maintained at 100° C. 500 ml of this filtrate is placed in a jacketed stirred vessel with the jacket temperature at 100° C. The temperature is lowered in the crystallizer as follows:

| Time (minutes) | Temperature (°C.) |
| --- | --- |
| 0 | 100 |
| 60 | 90 |
| 120 | 75 |
| 180 | 55 |
| 210 | 25 |

The resulting solid was washed and dried employing the procedure described above. The resulting material was analyzed as follows:

| | |
| --- | --- |
| ZnO | 99+% |
| Lead | <50 ppm |
| Cd | <25 ppm |
| Fe | <25 ppm |

The cooling profile in Example 10 is known as a reverse natural cooling profile. Such a profile is the opposite shape as that which is observed by natural cooling. In a reverse natural cooling profile, the cooling is slower at the beginning and faster at the end; in a natural cooling profile, the cooling is faster at the beginning and slower at the end. This type of cooling profile also is used to control the crystal size distribution (CSD) of the zinc oxide obtained. The cooling profile controls the ratio of nucleation (birth of a new crystal) to crystal growth (growth of existing crystals). The ratio of nucleation/growth determines the final CSD.

EXAMPLE 11

A 23% ammonium chloride solution at 100° C. containing 11% by weight dissolved ZnO is divided into 4 portions. Each portion is placed in a jacketed agitated vessel. The cooling profiles in each vessel are given below:

| Time (minutes) | Temp. (°C.) | Time (minutes) | Temp. (°C.) |
| --- | --- | --- | --- |
| Vessel A | | Vessel B | |
| 0 | 100 | 0 | 100 |
| 60 | 75 | 60 | 50 |
| 120 | 50 | 120 | 37.5 |
| 180 | 25 | 180 | 25 |
| Vessel C | | Vessel D | |
| 0 | 100 | 0 | 100 |
| 60 | 87.5 | 60 | 87.5 |
| 120 | 75 | 120 | 75 |
| 180 | 25 | 180 | 62.5 |
| | | 270 | 25 |

The solid is washed using the usual procedures described previously. The average size and size distribution of these materials were measured using a laser light scattering particle size analyzer. The results were as shown below:

| Vessel | Mean Size |
| --- | --- |
| A | 22 |
| B | 19 |
| C | 27 |
| D | 37 |

The results show that controlling the temperature with a reverse natural cooling curve results in a larger average size than by linear cooling (A) or natural cooling (B). This principle can be employed to design cooling profiles to produce zinc oxides of a desired average size and distribution.

3. Recycle

The purpose of this process is to produce pure zinc oxide from waste dust containing zinc. To do so efficiently and in a safe and cost effective way, the process recycles all zinc which is not removed from the leachate in the crystallization step. In addition, the diamino zinc dichloride which is redissolved in water in the washing step also is recycled. The recycle of zinc increases the overall zinc concentration in liquid solution in the process. This allows the crystallizer to operate at a higher temperature due to the rapid change in zinc oxide solubility with temperature in ammonium chloride solution. An example of the process with recycle is given below:

EXAMPLE 12

By controlling the recycle, the steady state zinc concentration can be raised to 7 g/100 g of solution. If the outlet of the crystallizer is kept at 60° C., 3 g/100 g solution of solid will crystallize (the solid is a mixture of zinc oxide and diamino zinc dichloride). The system does not have to be cooled further since this is an efficient way to operate to conserve energy (one does not have to cool then reheat the solution). In addition, operating at the higher Zn concentration improves the ratio of ZnO/diamino zinc dichloride produced in the crystallizer.

The recycle has the advantage that the solution becomes saturated relative to certain materials present in the dust, such as CaO. When this occurs, CaO no longer is leached from the dust but remains with the iron in the iron cake. This increases the value of the cake since CaO is still present and will not have to be added when the iron cake is fed to a furnace in steel making. Another important advantage in that there is no liquid effluent in this process. The only products are solid (iron cake, zinc oxide, waste metals), which are then sold for use in various industrial processes. No waste is produced since all liquid is recycled.

CARBON ADDITION STEP FOR RECOVERY OF IRON-CARBON AND DIRECT-REDUCED IRON PRODUCTS

The present process also can be operated to produce a high-quality iron-carbon cake as a residual product. The iron oxide contained in the waste stream does not go into solution in the ammonium chloride solution, but is filtered from the product solution as undissolved material. This iron oxide cake can be used as is as the feedstock to a steel mill; however, it becomes more valuable if reduced by reaction with elemental carbon to produce an iron-carbon or direct-reduced iron product. One preferred method for producing such an iron-carbon or direct-reduced iron product from the waste material comprises the steps of:

a. treating the waste material with an ammonium chloride solution at an elevated temperature to form a product solution which comprises dissolved zinc and dissolved zinc oxide whereby any iron oxide in the waste material will not go into solution;

b. adding carbon to the product solution whereby the carbon will not go into solution; and then c. separating the product solution from any undissolved materials present in the product solution including any of the iron oxide and the carbon.

A mixture of iron oxide and carbon is used by the steel industry as a feedstock for electric arc furnaces. The iron oxide cake which is removed as undissolved material from the leaching step is primarily iron oxide, being a mixture of $Fe_2O_3$ and $Fe_3O_4$. The iron cake can be made into the mixture of iron oxide and carbon by adding elemental carbon to the iron oxide cake in several manners. First, carbon can be added to the leaching tank at the end of the leaching step but before the undissolved materials are separated from the product solution. Since the carbon is not soluble in the ammonium chloride solution and will not react in an aqueous solution, the iron cake and the carbon can be separated from the product solution and made into a hard cake. Different size carbon, such as dust, granules, or pellets, may be used depending on the desires of the steel makers. Second, the carbon can be added to the iron oxide after the iron oxide has been separated from the product solution. The dried iron oxide and the carbon can be ribbon blended in a separate process.

Combining carbon and iron oxide results in the reduction of the iron oxide, producing direct-reduced iron (DRI). DRI can be used to replace part or all of the steel scrap charged to a steel mill. In some operations, DRI is preferred to scrap because it has a known uniform composition and generally contains no residual elements such as chromium, copper, nickel, and tin. Also, when DRI is melted, it forms a foamy slag because it contains both carbon and iron oxide. Because the price of steel scrap usually is lower than DRI, the use of DRI usually cannot be economically justified. DRI typically runs in the $120.00 per ton range. However, since the iron oxide is a residual product of this process, with the main value of the process being from the zinc oxide product, the iron oxide or direct-reduced iron can be produced more economically. Therefore, the iron oxide produced as a residual in this process has significant value.

The undissolved materials primarily comprise iron oxide and carbon which has significant value as a feedstock to a steel mill, as discussed above. Generally the iron oxide and carbon product is pressed into a cake for ease of handling and use. The cake typically contains approximately 82% solids, but may range from 78% to 86% solids and be easily handled and used. Although cakes of less than 78% solids can be formed, the other 22%+ of material would be product solution which, if the cake is used as a feedstock to a steel mill, would be reintroduced to the steel-making process, which is uneconomical. Likewise, drying the cake to have more than 86% solids can be uneconomical. The product solution from this process can be treated similarly to the treatment of the product solution in steps d through j of the general method disclosed above.

SEPARATION AND RECOVERY OF LEAD AND CADMIUM FROM WASTE METALS CAKE

The present process also can be operated to produce essentially pure lead and cadmium from the waste metals cake filtered out of the solution after the cementation step. Once recovered, these metals can be sold as products suitable for a variety of uses. A preferred method for recovery of these metal byproducts comprises:

a. washing the waste metals cake filtered from the solution after the cementation step with water;

b. treating the waste metals cake with sulfuric acid, which will dissolve zinc, cadmium and copper present in the waste metals cake;

c. removing lead metal, which is insoluble in sulfuric acid, is removed from the solution, dissolving and reprecipitating and lead oxide as lead sulfate; and d. electrochemically removing dissolved cadmium from the solution by placing zinc metal sheets into the solution onto which the cadmium plates to produce a cadmium sponge.

The lead solids may be filtered, washed with water, and dried under an inert gas such as nitrogen to produce a relatively pure lead metal. Some impurities are present in the form of lead oxide, lead sulfate, copper, zinc, and cadmium. Alternatively, electrolysis may be used to cause cadmium in the solution to plate out as a sponge on other cathodic materials. The solution remaining is mainly zinc in sulfuric acid, which can be recycled back to the leach solution for eventual recovery of the zinc as zinc oxide.

A cake of waste metals is produced during the cementation step when zinc dust added to the ammonium chloride solution causes an electrochemical reaction in which lead, cadmium, and copper atoms plate out on the surface of the zinc dust. The resulting solids are filtered from the solution to produce a cake of waste metals. The waste metals cake is washed with water to remove any remaining solution. Wash water may be purified and recycled as described hereinafter. The waste metals cake is then treated with sulfuric acid. The sulfuric acid dissolves zinc, cadmium, and copper present in the waste metals cake, with zinc and cadmium dissolving at a more rapid rate than copper present in the cake. Lead metal is not soluble in sulfuric acid, thus lead present in the waste metals cake will remain in solid form.

In the preferred lead and cadmium recovery process, the waste metals cake is leached by the addition of a dilute sulfuric acid solution which forms a slurry. The reaction of the zinc oxide in the dust and the sulfuric acid is an exothermic reaction. The reactions of cadmium oxide, copper oxide and lead chloride with the sulfuric acid are relatively slower, with the reaction of copper oxide being the slowest. Lead sulfate is formed which is insoluble and removed by filtration at this point. The cadmium solids obtained from the cementation steps can be dissolved by sulfuric acid resulting in soluble sulfates of zinc and cadmium being formed. The zinc sulfate is recycled to the acid leach. This treatment causes the following major reactions to occur:

(1) $ZnO+H_2SO_4 \rightarrow Zn^{++}+SO_4^{--}+H_2O$ (fast, exothermic)

(2) $CdO+H_2SO_4 \rightarrow Cd^{++}+SO_4^{--}+H_2O$ (3) $CuO+H_2SO_4 \rightarrow Cu^{++}+SO_4^{--}+H_2O$ (slower)

(4) $PbCl_2+H_2SO_4 \rightarrow PbSO_4$ (insoluble)+HCl

Thus, metallic and sulfate ions are formed along with insoluble lead sulfate. Additional sulfuric acid may be added until the solution remains acid (pH<2 and preferably pH~1). In this way, an economical minimum of acid is consumed. The rapid rate of reaction (1) allows this to be done with little delay. Reaction (1) releases a great deal of heat, and external heating of the solution may not be required. Reactions (2) and (3) take longer to go to completion during the leach stage and the levels of Cd and Cu in solution may be monitored. Leaching may continue until all of the extractable copper is dissolved. It is preferable that the leachable Cu and Cd be removed before proceeding. It is preferable also that a water rinse or second dilute leach take place in order to rinse the solids clean of any entrapped ions, and prevent contamination of the next leach steps.

Soluble lead oxide is present in these dusts and is converted to the highly insoluble lead sulfate. The abundance of sulfate ions present in solution greatly suppresses the solubility of lead ions. Due to reaction (4), the chloride ions are introduced into the leach liquor. Zinc sulfate targeted for the electro-chemical uses must be kept low in chloride, but even so, the high solubility of zinc chloride makes contamination unlikely, and easy to remove by recrystallization. The lead solids are filtered from the solution, washed with water, and dried under nitrogen. This solid is mainly lead metal with some impurities including lead oxide, lead sulfate, copper, zinc, and cadmium.

After filtering out the neutral precipitate, the neutral filtrate solution pH may be adjusted to become slightly acidic (pH 4–5) by the addition of an acid, preferably sulfuric acid. The solution then may be measured for copper and lead content. The remaining solution contains cadmium and zinc with small amounts of copper and possibly lead present. The pH of the solution can be adjusted to and maintained at the preferred pH of 4–5 by the addition of zinc oxide. Cadmium present in the solution may be removed electrochemically by placing a sheet of zinc metal into the solution to produce a cadmium sponge by the following reaction:

(5) $Cd^{++}+Zn^\circ > Cd^\circ metal$ (sponge)+$Zn^{++}$

Alternatively, electrolysis may be used to recover cadmium present in the solution. This cadmium sponge may be separated from the zinc metal sheet, rinsed and redissolved in sulfuric acid to produce high purity cadmium sulfate by the following reaction:

$Cd^\circ+H_2SO_4 > CdSO_4+H_2$ (slow)

Air oxidation of the cadmium will increase the rate of attack by sulfuric acid solutions, greatly increasing the rate of dissolution, and forming water as the reaction's only byproduct:

$CdO+H_2SO_4 \rightarrow CdSO_4+H_2O$ (fast)

The cadmium sponge product, likewise, may be removed from the zinc sheet and sold directly as cadmium metal.

After removal of the cadmium sponge and zinc sheet, the remaining solution is mainly zinc and sulfuric acid. This solution may be recycled by combining it with the primary leach solution, thus enabling eventual recovery of the zinc as zinc oxide. The sulfate will react with calcium present in the primary leach solution, and will precipitate as calcium sulfate.

EXAMPLE 13

A sample of the mixed waste metals cake was taken fresh from the mixed metals press and placed into an air tight plastic bag. The cake was mixed within the bag and excess liquid was removed by allowing the bag to drain. Attempts were made to exclude air from the bag as well. The major elemental composition of this cake material tested to be:

| Element | Weight % |
|---------|----------|
| Cd      | 1.5      |
| Cu      | 1.0      |
| Pb      | 19.2     |
| Zn      | 2.1      |

Other materials present include water and ammonium chloride, as well as oxides of the mixed metals.

A sample of this mixed metals cake was taken from the bag, added to a beaker, and washed with an equal weight of warm water on a hot plate with mechanical stirring. Some white precipitate, mainly zinc oxide, formed by the decomposition of the complex diamino-zinc salt. The washing step was carried out to remove ammonium chloride, and other soluble components, if present.

The wash water was decanted from the product. Fresh water was added, enough to cover the solids, to prevent any further air oxidation of the solids and a large excess of sulfuric acid added in stages over several days, during which time bubbling was noted. No heating was applied. Additional sulfuric acid was added when the pH of the mixture reached 5. The solution was mixed and then allowed to react, without further mixing. When analyzed the elemental composition was:

| Element | Weight % |
|---------|----------|
| Cd      | 0.19     |
| Cu      | 4.1      |
| Pb      | 43.2     |
| Zn      | 0.04     |

The solid was observed with crossed polars under a microscope, and a great deal of crystalline-"non-metallic" material was noted. A majority of this material likely is lead sulfate, formed by the reaction of the lead metal with the acid. Remainders are likely to be copper and lead metal. The solution produced in this process also was analyzed and found to contain zinc and cadmium in large amounts, while having very low concentrations of copper and lead. This solution can be further treated by cementation processes, if desired to produce high purity cadmium metal.

EXAMPLE 14

A second batch of washed mixed metals was taken from the waste metals cake described in Example 13 and treated hot with a limiting amount of sulfuric acid (10 g acid/100 g mixed metals). Reaction was allowed to continue for 4 hours. At the end of this time the pH increased to 6, meaning the acid had been completely reacted with the product.

A sample of the remaining solids was collected and allowed to air dry on a warm glass slide. It was analyzed to contain:

| Element | Weight % |
|---------|----------|
| Cd | 1.9 |
| Cu | 4.0 |
| Pb | 78 |
| Zn | 2.9 |

By microscopy, the product appeared to be much higher in metallic solids than the previous run. Some crystalline material similar to the previous material was noted, however.

ELECTROLYSIS STEP FOR ZINC RECOVERY

The present process can be operated to recover zinc metal by replacing the crystallization steps with an electrolysis step. One preferred method for the recovery of zinc oxide from waste material streams which comprise zinc compounds using electrolysis comprises the steps of:

a. optionally treating the waste material a first time with an ammonium chloride solution at an elevated temperature to form a first product solution which comprises dissolved zinc constituents whereby any iron oxide in the waste material will not go into solution;

b. if the first ammonium chloride leach is used, separating the first product solution from the undissolved waste material compounds present in the first product solution including any of the iron oxide;

c. roasting the undissolved waste material compounds from the first leach, or roasting the waste material, at an elevated temperature and in a reducing atmosphere to create a roasted waste material compound;

d. treating the roasted waste material compound with the ammonium chloride solution at an elevated temperature to form a product solution which comprises dissolved zinc constituents whereby any iron oxide remaining in the roasted undissolved waste material compounds will not go into solution;

e. combining the first product solution, if the first ammonium chloride leach is used, with the product solution to form a combined product solution, maintaining the combined product solution at a temperature of at least 90° C., and adding powdered zinc metal and a dispersant to the combined product solution whereby any lead and cadmium ions contained within the combined product solution are displaced by the zinc metal and precipitate out of the combined product solution as lead and cadmium metals and the dispersant is selected from the group consisting of dispersants which will prevent the aggregation of the zinc metal;

f. separating the combined product solution from the lead and cadmium metals; and then g. subjecting the combined product solution to electrolysis to extract zinc metal from said combined product solution.

The combined product solution from the leaching steps comprises zinc ions in solution as $Zn^{2+}$. When the combined product solution is subjected to electrolysis in an electrolytic cell containing an anode and a cathode, the zinc metal is electrodeposited on the cathode. Although it is preferable to have the cathode made from zinc metal, cathodes of other material also will allow the electrodeposition of zinc metal from the combined product solution.

Any of the electrolysis cells discussed in the literature are suitable, as long as such cells are configured for the electrolysis of zinc ion containing solutions. The two electrodes of the electrolysis cells are connected externally to a power supply capable of impressing a suitable voltage across the electrodes. The zinc ions, being positive in nature, migrate toward the negative electrode, or cathode, where they combine with electrons supplied by the external circuit to form neutral zinc metal atoms. When this happens, the zinc metal, in effect, electroplates onto the cathode. By using a zinc cathode, the entire cathode can be removed and used as necessary as a source of zinc. Alternatively, a cathode on which electroplated zinc metal can be easily removed can be used.

PERIODIC PRECIPITATION OF OTHER SOLUBLES FROM THE PRODUCT SOLUTION

The product solution also contains sodium, potassium, magnesium, calcium, manganese, and other solubles in solution. These solubles can be recovered by introducing an electrolyte either in the leaching step or in the ammonium chloride storage tanks receiving the recycled product solution. As ammonium chloride is used as the leachant, ammonium salts in solution is the preferred electrolyte. For example, if some ammonium sulfate is added, one could precipitate out calcium sulfate. Ammonium sulfate is a preferred electrolyte to add because the process already uses ammonium in the form of ammonium chloride. The preferred electrolytes include ammonium sulfate, ammonium hydroxide, or ammonium carbonate to precipitate out various solubles. Manganese can be removed by the addition of an oxidizing agent such as potassium permanganate or hydrogen peroxide. This oxidation results in soluble $Mn^{2+}$ being oxidized to insoluble $Mn^{4+}$ which will precipitate out as a manganese solid.

RECOVERY OF AMMONIUM CHLORIDE AND WASH WATER PURIFICATION

The wash water used to wash the zinc compounds precipitated from the product solution contains some ammonium chloride, as well as other compounds. Rather than dispose of this polluted wash water, it can be treated to produce pure water and a more concentrated solution containing ammonium chloride and other compounds. The pure water can be recycled to wash additional zinc compounds precipitated from the product solution, and the concentrated solution can be recycled back to the leaching step. The purification can be accomplished using evaporator condensers or reverse osmosis membrane technology.

From an economically competitive situation, the use of reverse osmosis membrane technology to filter the wash water containing ammonium chloride solution to obtain pure water on one side of the membrane and a concentrated ammonium chloride solution on the other side of the membrane, will save energy costs. Every so often it will be necessary to back flush the salts off of the membrane to recover them for makeup use in the future. In essence, reverse osmosis membrane technology is using a pump to pump the wash water through a membrane, which is significantly lower in cost than burning natural gas in an evaporator condenser to evaporate and recondense distilled water. This technology is used to filter out sodium chloride and the minerals out of sea water to make distilled water.

The above description sets forth the best mode of the invention as known to the inventor at this time, and the above Examples are for illustrative purposes only, as it is obvious to one skilled in the art to make modifications to this process without departing from the spirit and scope of the invention and its equivalents as set forth in the appended claims.

What is claimed is:

1. In a zinc oxide recovery process having an ammonium chloride solution leaching step, and a zinc metal cementation step whereby lead and cadmium are removed from recoverable zinc compounds thereby producing a waste metals cake comprising lead and cadmium, the improvement comprising the steps of:
   a. treating the waste metals cake in a dissolving solution wherein zinc and cadmium are soluble and lead is insoluble;
   b. recovering the lead by separating the lead from said dissolving solution; and
   c. recovering the cadmium from said dissolving solution by electrochemical means.

2. The improved zinc oxide recovery process characterized in claim 1, wherein said dissolving solution comprises sulfuric acid.

3. The improved zinc oxide recovery process characterized in claim 1, wherein a zinc metal article is placed in said dissolving solution, whereupon cadmium dissolved in said solution deposits on the zinc metal article to form a cadmium sponge.

4. The improved zinc oxide recovery process characterized in claim 1, wherein said cadmium is deposited by electrolysis on a cathodic surface to form a cadmium sponge.

5. The improved zinc oxide recovery process characterized in claim 1, further comprising the step of combining said dissolving solution with the ammonium chloride solution, thus enabling further recovery of any zinc present in said dissolving solution.

6. In a zinc oxide recovery process having a step for roasting a zinc-containing waste material at an elevated temperature in a reducing atmosphere, a treatment step for forming a product solution of zinc-containing waste in an ammonium chloride leaching solution, a separation step for removing undissolved materials from the leaching solution, and a zinc metal cementation step for removing lead and cadmium from recoverable zinc compound thereby producing a waste metals cake, the improvement comprising the steps of:
   a. treating the waste metals cake with a sulfuric acid solution such that zinc and cadmium in the waste metals cake are dissolved in the solution and lead in the waste metals cake is not dissolved in the solution;
   b. recovering the undissolved lead from the sulfuric acid solution; and
   c. recovering the cadmium dissolved in sulfuric acid by electrochemical means.

7. The improved zinc oxide recovery process characterized in claim 6, wherein a zinc metal article is placed in said dissolving solution, whereupon cadmium dissolved in said solution deposits on the zinc metal article to form a cadmium sponge.

8. The improved zinc oxide recovery process characterized in claim 6, wherein cadmium is deposited by electrolysis on a cathodic surface to form a cadmium sponge.

9. A method for recovering lead and cadmium from a waste metals cake obtained from a waste stream from a metal oxide recovery process, comprising the steps of:
   a. treating the waste metals cake in a dissolving solution wherein zinc and cadmium are soluble and lead is insoluble;
   b. filtering the lead from said dissolving solution; and
   c. recovering the cadmium from said dissolving solution by electrochemical means.

10. The method as claimed in claim 9, wherein said dissolving solution is sulfuric acid.

11. The method as claimed in claim 9, wherein said a zinc metal article is placed in said dissolving solution, whereupon cadmium dissolved in said solution deposits on the zinc metal article to form a cadmium sponge.

12. The method as claimed in claim 9, wherein cadmium is deposited by electrolysis on a cathodic surface to form a cadmium sponge.

13. A method for the reclamation of lead and cadmium metals from dust containing zinc, copper, lead, and cadmium compounds comprising the steps of:
   a. treating said dust with a leachant until at least a substantial portion of the zinc is dissolved and separating at least a substantial portion of any undissolved solids in and insoluble compounds formed from the solution;
   b. adding a zinc compound to said solution to increase the pH of the solution to a sufficient level to cause the formation of precipitates of basic sulfate salts and separating said basic sulfate salts from the solution;
   c. adding zinc metal to the solution to achieve a first cementation step whereby lead, copper, and cadmium ions contained within the solution are displaced by said zinc metal and precipitate out of the solution as a waste metals cake comprising lead, zinc, and cadmium; and
   d. treating said waste metals cake with a dissolving solution wherein zinc and cadmium are soluble and lead is insoluble and separating at least a portion of the lead from the solution; and
   e. recovering at least a portion of the cadmium from said solution by electrochemical means.

14. The method as claimed in claim 1, wherein said dissolving solution is sulfuric acid.

15. The method as claimed in claim 14, wherein cadmium metal is recovered from said cadmium compounds by treating said cadmium compounds with a sulfuric acid solution in the presence of a zinc metal article, said cadmium metal forming on said zinc metal article as a cadmium sponge.

16. The method as claimed in claim 15, wherein any zinc sulfate remaining in the solution after the formation of the cadmium sponge is recycled to step a).

17. A method for the reclamation of zinc, copper, cadmium, lead and tin from dust containing said metals, comprising the steps of:
- a. treating said dust with a leachant solution comprising of sulfuric acid until at least a substantial portion of the zinc is dissolved and any lead in said dust will not go into solution and separating said lead from said solution;
- b. adding a compound selected from the group consisting of zinc oxide and zinc hydroxide to said solution to increase the pH of said solution to a sufficient level to cause the formation of precipitates of sulfate salts and separating said salts from said solution;
- c. adding a zinc metallic dust to said solution to achieve a first cementation step causing the formation of copper solids and separating at least a portion of said copper solids from said solution; and
- d. adding a zinc metallic article to said solution in an electrolysis step causing the formation of a cadmium sponge on said zinc metallic article and separating at least a portion of said cadmium sponge from said solution.

18. The method as claimed in claim 1, further comprising the step of adding an oxidizing agent to the solution to convert soluble manganese ions to insoluble manganese ions, said insoluble manganese ions forming a precipitate, and removing said precipitate from the solution.

* * * * *